(12) United States Patent
Carnahan et al.

(10) Patent No.: US 9,517,953 B2
(45) Date of Patent: Dec. 13, 2016

(54) METHOD AND SYSTEM FOR TREATMENT OF AGRICULTURAL AND INDUSTRIAL WASTEWATERS CONTAINING SOLIDS AND NUTRIENTS

(75) Inventors: Robert P. Carnahan, Temple Terrace, FL (US); Christopher C. Tubbs, Temple Terrace, FL (US); Nidal Samad, Merritt Island, FL (US)

(73) Assignee: FARM PILOT PROJECT COORDINATION, INC., Tampa, FL (US)

( * ) Notice: Subject to any disclaimer, the term of this patent is extended or adjusted under 35 U.S.C. 154(b) by 0 days.

(21) Appl. No.: 13/425,656

(22) Filed: Mar. 21, 2012

(65) Prior Publication Data

US 2013/0068696 A1 Mar. 21, 2013

Related U.S. Application Data

(60) Provisional application No. 61/454,923, filed on Mar. 21, 2011.

(51) Int. Cl.

| | |
|---|---|
| *C02F 1/52* | (2006.01) |
| *C02F 1/00* | (2006.01) |
| *C02F 1/24* | (2006.01) |
| *C02F 1/66* | (2006.01) |
| *C02F 11/12* | (2006.01) |
| *C02F 101/32* | (2006.01) |

(52) U.S. Cl.
CPC ............ *C02F 1/52* (2013.01); *C02F 1/008* (2013.01); *C02F 1/24* (2013.01); *C02F 1/66* (2013.01); *C02F 11/123* (2013.01); *C02F 2101/32* (2013.01)

(58) Field of Classification Search
CPC .................................. C02F 1/24; C02F 1/66
USPC ......................................................... 210/703
See application file for complete search history.

(56) References Cited

U.S. PATENT DOCUMENTS

| | | | | |
|---|---|---|---|---|
| 4,744,903 | A * | 5/1988 | McAninch et al. | 210/632 |
| 4,765,914 | A * | 8/1988 | Marikovsky et al. | 210/716 |
| 5,023,012 | A * | 6/1991 | Buchan et al. | 252/181 |
| 5,670,047 | A * | 9/1997 | Burke | 210/603 |
| 5,948,269 | A * | 9/1999 | Stone | 210/718 |
| 2002/0000413 | A1 * | 1/2002 | Matsumoto et al. | 210/718 |
| 2003/0160003 | A1 * | 8/2003 | Maree | 210/724 |

(Continued)

*Primary Examiner* — Peter Keyworth
(74) *Attorney, Agent, or Firm* — Matthew G. McKinney, Esq.; Allen, Dyer, Doppelt, Milbrath & Gilchrist, P.A.

(57) ABSTRACT

A method and system of treatment of agricultural and industrial wastewaters that contain high concentrations of suspended solids, nitrogen, and phosphorus compounds is disclosed. The method and system includes pre-treating the wastewater, controlling the amount of coagulants used, and controlling the mean velocity used for mixing, surface loading rate, and solids loading rate. The method and system functions as a sedimentation unit and gas flotation unit (solid/liquid separator). The pH of the effluent wastewater is stabilized within the separator by ensuring that there is sufficient alkalinity to buffer the wastewater. Sufficient gas is produced in the coagulation reactions to float and concentrate the solids, which results in as high as 99 percent reduction in suspended solids, a 96 percent reduction of the phosphorus concentration, and a 50 percent reduction of the nitrogen concentration in the effluent from the separator.

8 Claims, 3 Drawing Sheets

(56) References Cited

U.S. PATENT DOCUMENTS

2008/0251439 A1* 10/2008 Pollock .................. 210/194
2010/0193416 A1*  8/2010 Barbaro et al. ............ 210/102

* cited by examiner

METHOD AND SYSTEM FOR TREATMENT OF AGRICULTURAL AND INDUSTRIAL WASTEWATERS CONTAINING SOLIDS AND NUTRIENTS

I. CROSS REFERENCE TO RELATED APPLICATIONS

This application claims the benefit of U.S. Provisional Application No. 61/454,923 filed Mar. 21, 2011. The disclosure of the provisional application is incorporated herein by reference.

II. FIELD

The present disclosure is generally related to a method and system of treatment of agricultural and industrial wastewaters containing solids and nutrients.

III. BACKGROUND

Agricultural and industrial wastewaters are often laden with suspended solids, nitrogen compounds, and phosphorus compounds. These compounds are both inorganic and organic in nature. Their concentrations range from 10 to 20 times of those values commonly found in domestic wastewaters. Typical retention times of 1.5 hours are needed to remove the compounds from the wastewater. The long retention times required to treat the wastewater reduces the volume of wastewater that can be treated by a facility on a daily basis. Thus, there is a need for a method and system that can reduce the retention times needed to remove compounds from wastewater to increase the volume of wastewater that can be treated by a facility on a daily basis.

In addition, most states have adopted water quality and environmental regulations that restrict farms from discharging the wastewater site into receiving streams. Furthermore, the regulatory statutes have restricted the amount of nutrients that may be applied to the land. These actions while they are environmentally sound, limits the amount of solids and liquid waste that farmers may apply to their land, which imposes an economic burden on the farmer. Accordingly, there is a need for a method and system that provides the farmer with a more economical method and system for management of the solid and the liquid waste.

The composition of the waste varies significantly from location and type of farming operations being performed. Also, the composition of the waste, nutrients and solids, vary from day to day and site to site. Thus, there is a need in the art for a method and system of treatment of wastewater that includes provisions for pH control, recycle and dissolved gas addition.

IV. SUMMARY

In a particular embodiment, a method of treatment of agricultural and industrial wastewaters is disclosed. The method includes receiving wastewater for treatment, adjusting a pH of the wastewater, adding a coagulant to the wastewater to form at least carbon dioxide, separating floatable solids buoyed up by the carbon dioxide from a clarified effluent in a separator, and removing the floatable solids and clarified effluent from the wastewater. In addition, the method includes adding acids, bases, or any combination thereof, to adjust the pH of the wastewater. The pH of the wastewater is adjusted so that at least 90 percent of alkalinity of the wastewater is in the form of a bicarbonate ion and the pH of the wastewater is between 6.3 and 10.3. The method also includes pretreating the wastewater to remove at least a portion of suspended solids from the wastewater before adjusting the pH or adding coagulants.

In another particular embodiment, a system of treatment of agricultural and industrial wastewaters is disclosed. The system includes a wastewater source to provide wastewater for treatment, a chemical feed system to add acids, bases, or any combination thereof, to adjust a pH of the wastewater, and a coagulant feed system to add a coagulant to the wastewater to form at least carbon dioxide. The system also includes a separator having a lower settling zone to collect settled suspended solids and an upper flotation zone to collect solids buoyed up by the carbon dioxide. In addition, the system includes an effluent collection system to remove floatable solids, clarified effluent, settled suspended solids, or any combination thereof, from the separator.

The pH of the wastewater is adjusted so that at least 90 percent of alkalinity of the wastewater is in the form of a bicarbonate ion. The pH of the wastewater is generally adjusted (or already is) to between 6.3 and 10.3. The coagulant may be aluminum sulfide, ferric sulfate, or any combination thereof. In addition, the system includes a mixer to mix the coagulant with the wastewater. A controller is used to control the chemical feed system and the coagulant feed system. A recycle return pump is used to provide a loop between effluent and influent flows of the separator. The pH of the effluent wastewater is stabilized within the separator by ensuring that there is sufficient alkalinity to buffer the wastewater. Sufficient gas is produced in the coagulation reactions to float and concentrate the solids, which results in as high as 99 percent reduction in suspended solids, a 96 percent reduction of the phosphorus concentration, and a 50 percent reduction of the nitrogen concentration in the clarified effluent from the separator.

Other aspects, advantages, and features of the present disclosure will become apparent after review of the entire disclosure, including the following sections: Brief Description of the Drawings, Detailed Description, and the Claims.

V. BRIEF DESCRIPTION OF THE DRAWINGS

VI. DETAILED DESCRIPTION

The method and system of treatment of agricultural and industrial wastewaters disclosed herein is an effective unit operation. The system 100 treats wastewaters 102 that are laden with suspended solids, nitrogen compounds, and phosphorus compounds. In particular, the separator unit 120 shown in FIG. 1, includes flocculation, sedimentation, and flotation technology that may reduce the nitrogen concentration by 35 to 50 percent, the phosphorus concentration by 85 to 96 percent, and total suspended solids by 95 to 99 percent. These separations results may be achieved while operating the separator at surface loading rates of 1,050 to 2,550 gallons-per-square-foot-per day (gal/sf-d) and no recycle. With a mean hydraulic retention time of only 25 minutes operating at 10 gpm, the system has a far shorter retention time than the traditional 1.5 hours. The ability to use these higher loading rates and short hydraulic retention time is due, at least in part, to the dual separation area of the separator.

Figure 1:
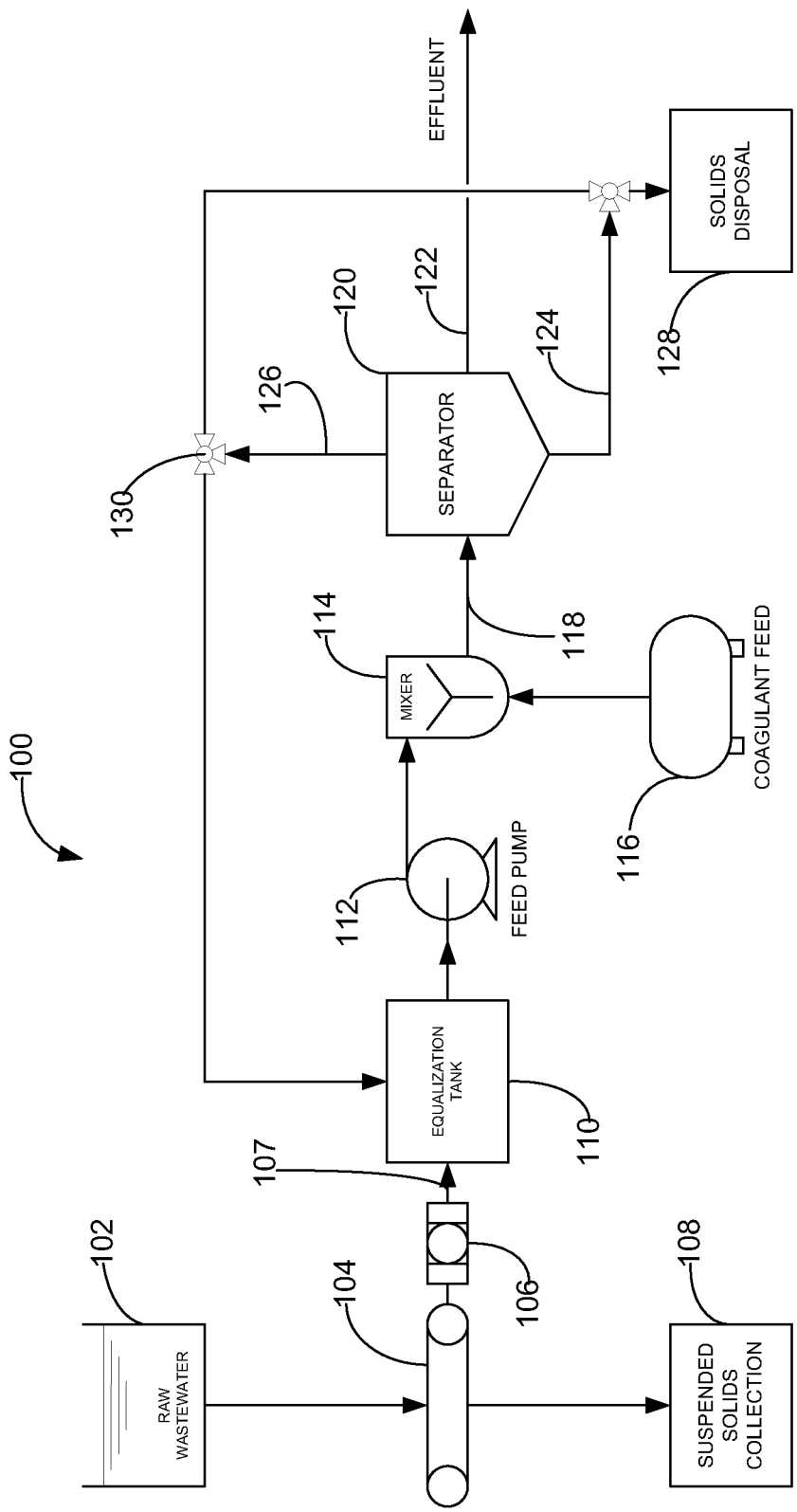
FIG. 1 is a flow diagram of a particular illustrative embodiment of a system of the treatment of wastewater.

FIG. 1 is a schematic diagram that shows the relative position of the separator 120 located after a pretreatment system 104 and ancillary treatment processes 106. An alternative drying process may also be used to dry the suspended solids 108 removed by the pretreatment system 104. An equalization tank 110 is required to stabilize the pretreated wastewater flow 107 from the pretreatment system 104. The coagulant feed 116 and process feed pump 112 are linked through a control loop so that once the chemical feed ratio to wastewater feed rate has been established a controller maintains the required dosage.

The method and system produces a clarified effluent 122 that meets regulatory standards and may be reused or disposed of without violating permitted values. The method and system also has applications in the treatment of wastewaters that contain greases and oils as well as higher concentrations of solids. Pretreatment usually is required and consists of processes that separate the suspended solids from the fluid phase of the wastewater. For example, the pretreatment separation processes may consist of screw presses, belt presses, drum separators, and filter presses 104. The method and system is compatible with any processes that are capable of separating the solids from the liquid wastewater. After separating the suspended solids 108 from the raw wastewater 102, the remaining dissolved and colloidal solids are easily removed from the pretreated wastewater 107 using the separator 120 as described below.

The method and system is pH dependent and may involve adjustment of the pH and alkalinity of the wastewater in addition to adding a coagulant 116. For separation, the preferred coagulants are metallic compounds such as aluminum sulfate, or ferric sulfate, and for specific wastewater, organic polymers may be used with the metallic coagulant. A process feed pump 112 pumps the pretreated wastewater 107 from the equalization tank 110 to a mixer 114. After the introduction of the coagulant(s) 116 into the pretreated wastewater 107 using a coagulant feed system, the mixer 114 (i.e., an inline static mixer) is required to provide the necessary turbulence for proper coagulation. The influent 118 then enters the settling zone of the separator unit 120 tangentially where the coagulation reactions are completed. One mole of ferric ions will produce three moles of carbon dioxide as well as one mole of ferric hydroxide precipitate. The critical condition for having reaction 1 to occur is adjustment of the pH so that at least 90 percent of the alkalinity is in the form of the bicarbonate ion. This condition ensures that the ferric hydroxide precipitate, ferric phosphate, and carbon dioxide will be formed as shown in equation 1.

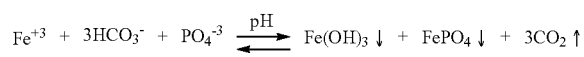

1

The solubility products of the ferric hydroxide and the ferric phosphate are $4\times10^{-38}$ and $1.3\times10^{-22}$ respectively (Dean, 1972). Based upon pilot plant data and solubility data there are indications that there is co-precipitation of the hydroxide and the phosphate. Formation of the bicarbonate ion as shown in equation 2 is essential precipitation of the phosphate and hydroxide and formation of the carbon dioxide generation. Success of the method and system is dependent upon controlling the pH and the stoichiometry of the chemical doses.

2

Alkalinity, equation 3, is a measurable quantity and used to determine the total concentration of the bicarbonate ion in the wastewater. As indicated in equation 2, the specific concentration of carbonate ions is determined based on pH of the wastewater solution. For example, the typical alkalinity of a dairy wastewater ranges from 1,000 mg/l to 3,000 mg/l as $CaCO_3$ and at a pH between 6.3 and 10.3 where the bicarbonate ion is the predominate species. Under these conditions, sufficient carbon dioxide will be produced to float the solids. For wastewaters that require further pH adjustment, a chemical feed system is provided that is capable of adjusting pH by feeding acids or bases. The type of acid or base used for the adjustment will depend upon the wastewater quality.

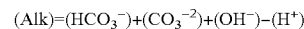

3

Alum has a similar reaction with alkalinity as the ferric ion as shown below in equation 4. Aluminum hydroxide has a slightly lower solubility limit than the ferric hydroxide precipitate.

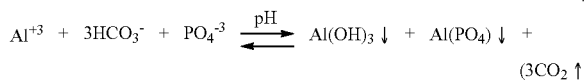

4

The carbon dioxide provides the mechanism for the flotation of the less dense and the coagulated solids (i.e., flotation solids), while denser ferric hydroxide precipitate may settle to the bottom of the settling tank. Mixing and flocculation of the solids is completed within the separator's settling zone. Therefore, the mean velocity gradient and weir overflow rates are sufficiently low to allow the carbon dioxide to buoy up the light solids. This forces these solids into the flotation separator hood, and allowing the heavier solids to settle into the sludge zone of the separator as described below.

The separator 120 may be easily added to an existing treatment system as depicted in FIG. 1. For example, the pretreatment system may include a press 104 for removal of the heavy solids 140 µm and higher in diameter followed by a filter 107 capable of removing solids with a particle size of 40 µm. FIG. 1 shows the integration of the separator 120 into an existing wastewater treatment system 100. The method and system uses an equalization tank 110 for stabilizing the pretreated wastewater flow 107 from transient variations in the flow rate. The chemical dose rate is maintained at steady state by synchronizing the flow rates of the pretreated wastewater flow 107 and the coagulant feed 116, thus ensuring chemical dosage is accurate and constant. Typically, dosages range from 0.5 milliliters of ferric ion to one liter of wastewater (ml/l) to as high as 5 ml/l. The critical point of the dosage is to ensure that there is sufficient alkalinity remaining within the wastewater to buffer the solution. However, the pH of the solution should be such that the alkalinity is in the ($HCO_3^-$) ionic state.

The effluent collection as shown in FIG. 1 consists of three systems, one for the collection of floatable solids 126, one for the clarified effluent 122, and the third one for the discharge of settled suspended solids 124. The floatable solids may be directed back to the pretreatment system or to a further drying process such as a drying bed. Sludge from the bottom of the separator 120 may be directed to further drying and may then be mixed with the solids from the pretreatment processes for disposal.

Figure 2:
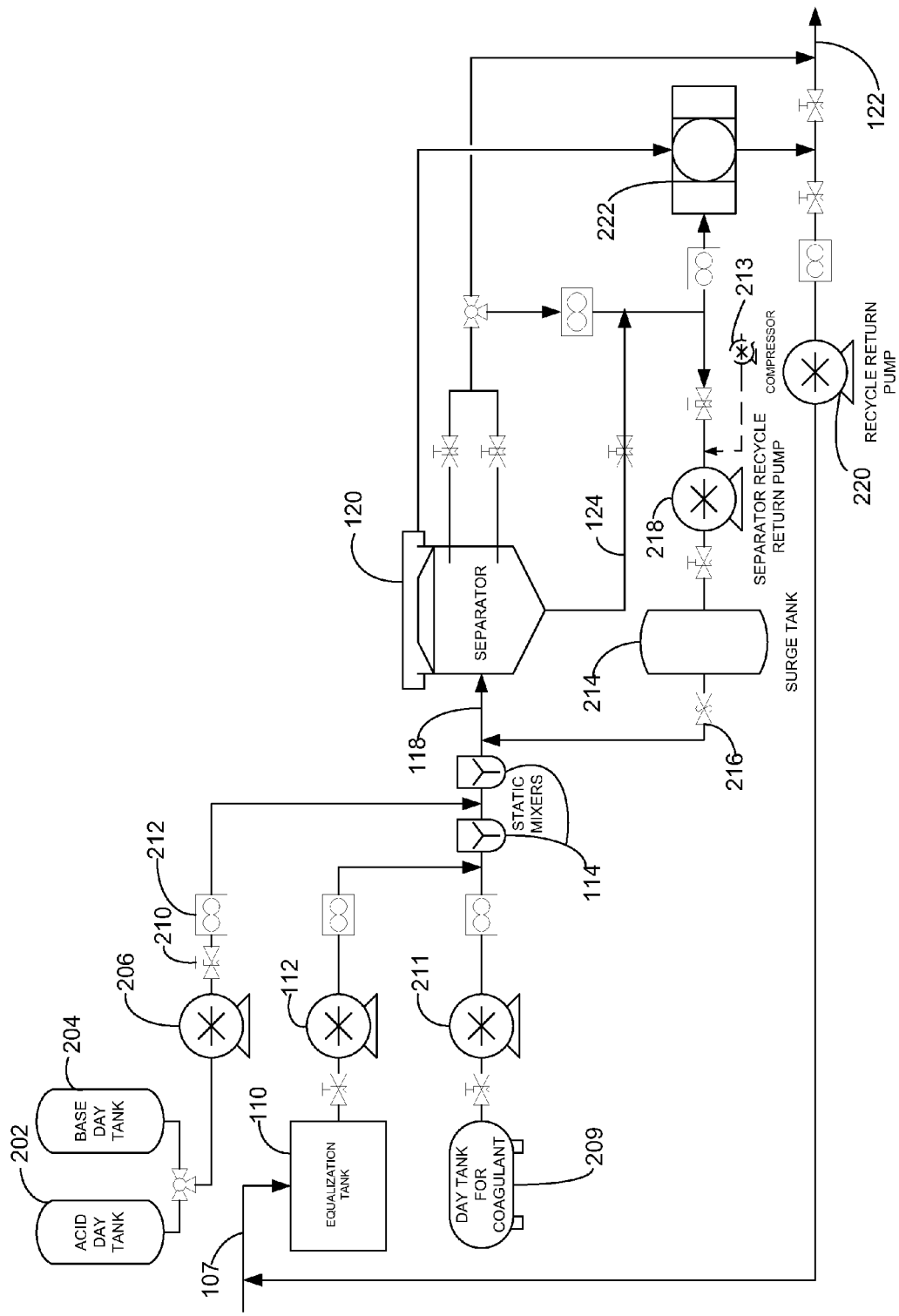
FIG. 2 is a schematic diagram of the system depicted in FIG. 1 and related components.

FIG. 2 depicts the ancillary equipment necessary for operation of the separator 120 in the flotation and the clarification modes. To better control the operation of the separator 120, a separator recycle return pump 218 and recycle return pump 220 are used to provide loops between the effluent and the influent lines. This permits the blending of a highly concentrated influent wastewater 118 with a portion of treated effluent 122, thus reducing the concentration of contaminants in the influent waste stream 118 making the wastewater more treatable. FIG. 2 also shows the recycle loop that may be used for supplemental flotation with the provision of a compressor 213, surge tank 214, and relief valve 216. A filter 222 may be used to further separate solids from the sludge and floatation solids effluent before recycling and/or for further processing.

The adjustment of the pH and alkalinity of the pretreated wastewater 107 is accomplished by using chemicals stored in an acid day tank 202 and a base day tank 204. A pH pump 206 and valve 210 of the chemical feed system are in communication with a controller that directs how much is added to the pretreated wastewater 107 for the process. Flow and pressure gauges 212 are used to monitor the system. The chemical dose rate is maintained at steady state by using the controller to synchronize the flow rates of the pretreated wastewater 107 and the chemicals from the coagulant day tank 209 of the coagulant feed system. A chemical feed pump 211 is used to help ensure the chemical dosage is accurate and constant.

The influent wastewater 118 enters the sedimentation zone of the separator 120 tangentially through a nozzle that causes a stirring of the fluid contents of the separation zone. This stirring ensures sufficient mixing to drive the coagulation reactions to completion. The tangential entry also provides closer access of the coagulant particles to the wall surface for more efficient separation of the solids. The hydraulic retention time within the unit is 30 to 60 minutes depending upon the flow rate of the influent wastewater 118, while the surface loading rates ranged from 1,050 gal/sf-d and 2,550 gal/sf-d. These rates, which are much higher than those typically used in design of municipal wastewater systems, take advantage of the floatable solids rising and providing for sedimentation of the heavier solids (Reynolds and Richards, 1996).

Figures 3, 4:
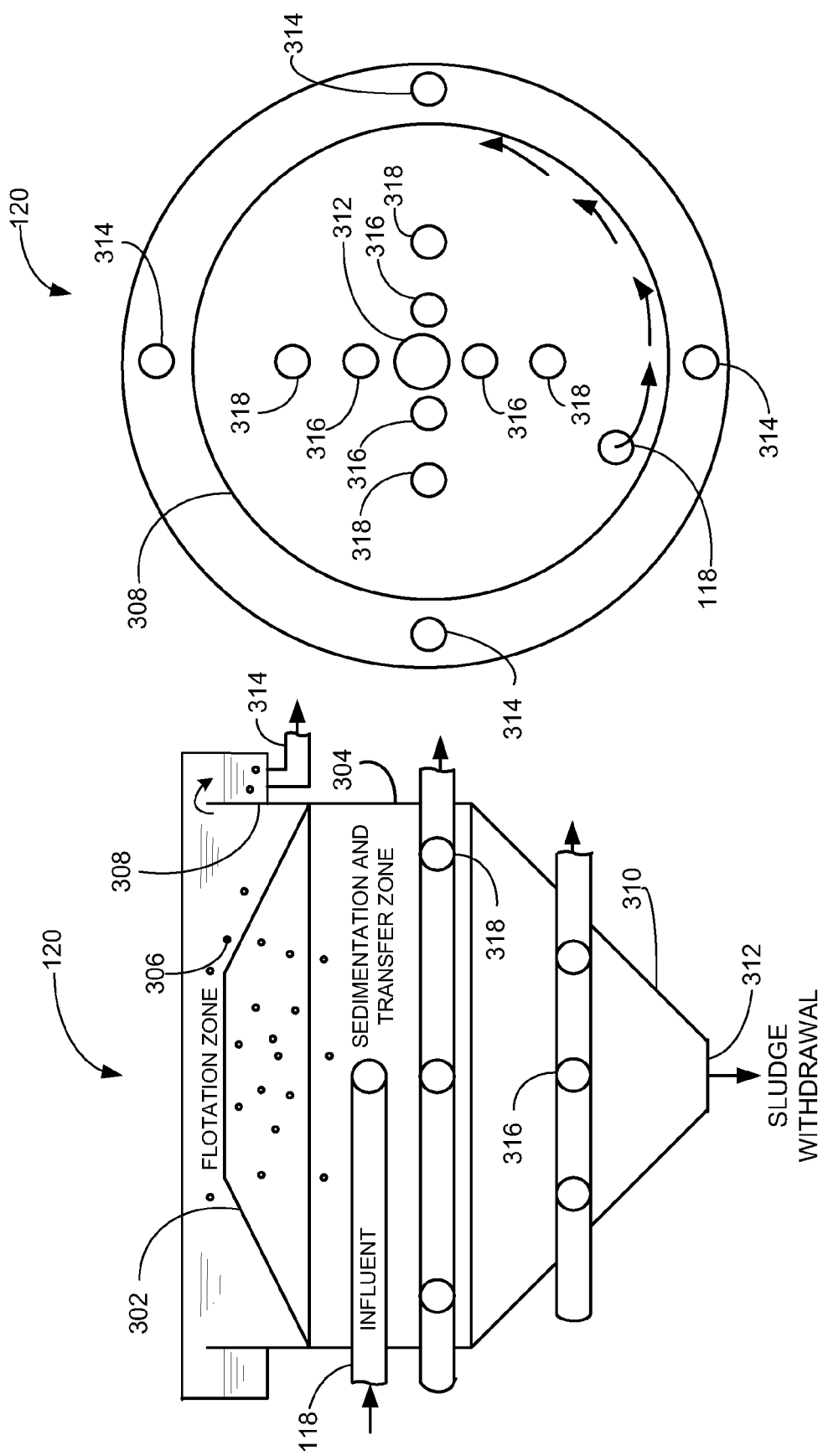
FIG. 3 is a schematic diagram of a separator of the system depicted in FIGS. 1 and 2.
FIG. 4 is a schematic partial top view of the separator depicted in FIG. 3.

The design characteristics and dimensions of a pilot plant version of the separator 120 shown in FIGS. 3 and 5 are provided below. Production versions of the separator 120 will have equivalent dimensions depending upon the required capacity of the production unit. For example, to treat 250,000 gallon-per-day of wastewater, the production unit is 15 feet in diameter and have a 30-minute hydraulic retention time. Dimensions of the production units are scalable.

The pilot plant similar to that shown in FIGS. 3 and 4, was constructed at a dairy farm to evaluate the performance of a separator 120 having the characteristics described below. The separator 120 was 42-inches in diameter with a wall height 304 of 3-feet and a cone height 310 of 2-feet. The sedimentation and transfer zone had 9.62-square-feet of surface area and a volume of 322 gallons of wastewater. The flotation zone had an additional volume of 71 gallons for a total volume of 393 gallons. This resulted in a hydraulic retention time that varied from approximately 60 minutes at a flow rate of 6.5 gallons-per-minute (gpm) to 40 minutes at a flow rate of 10 gpm. The results of the pilot plant study showed that the separator operated at efficiencies greater than 86 percent for removal of phosphorus at dosage ratios ranging from 1 ml of ferric to one liter of wastewater to 5 ml of ferric to one liter of wastewater.

The transition of the solids from the settling zone to the flotation zone is accomplished by using a flotation hood 302 as shown in FIG. 3. The hood 302 had an angle of inclination of 22 to 33 degrees with the horizontal plane, and terminated at a 1.5-foot diameter orifice. Solids coalesce, rise and pass from the settling zone to the flotation zone through the orifice. The flotation solids 306 collected in the flotation zone are buoyed up by the trapped carbon dioxide $CO_2$ and flow over the weir 308 located at the top of the separator 120 to flotation solids effluent lines 314. The flotation solids effluent wastewater is directed either to the pretreatment system or to further solids drying.

The effluent lines 314 for the flotation solids are located about the periphery of the separator 120. As described above, the flotation solids 306 are carried upward through an orifice centrally located within the hood 302. The solids that settle to the bottom of the separator 120 are removed through a sludge port 312 at the lower portion of the cone 310. The clarified effluent is removed from the separator 120 using upper effluent orifices 318, lower effluent orifices 316, or any combination thereof.

The system while operating at a flow rate of 12 gpm has the capacity to operate at an under flow flux rates of 2.0 pounds-per-square-foot-hour (lbs/sf-hr) to 4.0 lbs/sf-hr, which is equivalent to that of a standard thickener (Stephenson and Jr., 1998). The sludge may require further drying before disposing of the sludge. This process of separating solids has the capacity to operate at higher solids loading rate depending upon the coagulants used.

The previous description of the disclosed embodiments is provided to enable any person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features.

What is claimed is:

1. A method of treatment of wastewater, the method comprising:
   receiving wastewater for treatment;
   removing solids of about 40 microns and larger from the wastewater;
   adjusting a pH of the wastewater until at least 90 percent of alkalinity of the wastewater is in the form of a bicarbonate ion and the pH is between about 6.3 and 10.3, wherein the bicarbonate ion is a predominate carbonate species;
   adding a coagulant of ferric sulfate to the wastewater;
   transferring the resultant wastewater to a separator to form coagulated solids of nitrogen compounds, phosphorus compounds, suspended solids, and any combination thereof; and producing carbon dioxide to buoy up the coagulated solids in the separator by reacting the ferric sulfate with the wastewater.

2. The method of claim 1, further adding acids, bases, or any combination thereof, to adjust the pH of the wastewater.

3. The method of claim 1, wherein a mean hydraulic retention time of the separator is about 25 minutes.

4. The method of claim 1, further comprising surface loading the separator at a rate of about 1,050 to 2,550 gallons of wastewater per square foot per day.

5. The method of claim 1, further comprising:
floating the coagulated solids buoyed up by the carbon dioxide through a centrally disposed orifice that is disposed within a floatation hood; and
removing clarified effluent from the separator below the floatation hood.

6. The method of claim 1, wherein a screw press, belt press, drum separator, filter press, or any combination thereof, is used for the removing of solids greater than about 40 microns and larger from the wastewater.

7. The method of claim 1, further comprising mixing the coagulant with the wastewater using a mixer.

8. The method of claim 1, further comprising recycling effluent with influent flows of the separator.

\* \* \* \* \*